May 8, 1962 R. L. SIMMS, JR 3,033,936

SELECTOR CIRCUITS FOR TELEPHONE SWITCHING SYSTEMS

Filed Nov. 27, 1959 2 Sheets-Sheet 1

INVENTOR
R.L. SIMMS, JR.
BY
ATTORNEY

May 8, 1962 R. L. SIMMS, JR 3,033,936

SELECTOR CIRCUITS FOR TELEPHONE SWITCHING SYSTEMS

Filed Nov. 27, 1959 2 Sheets-Sheet 2

INVENTOR
R. L. SIMMS, JR.
BY [signature]
ATTORNEY

3,033,936
SELECTOR CIRCUITS FOR TELEPHONE SWITCHING SYSTEMS

Robert L. Simms, Jr., Hanover, N.J., assignor to Bell Telephone Laboratories, Incorporated, New York, N.Y., a corporation of New York Filed Nov. 27, 1959, Ser. No. 855,792
14 Claims. (Cl. 179—18)

Figure 1:
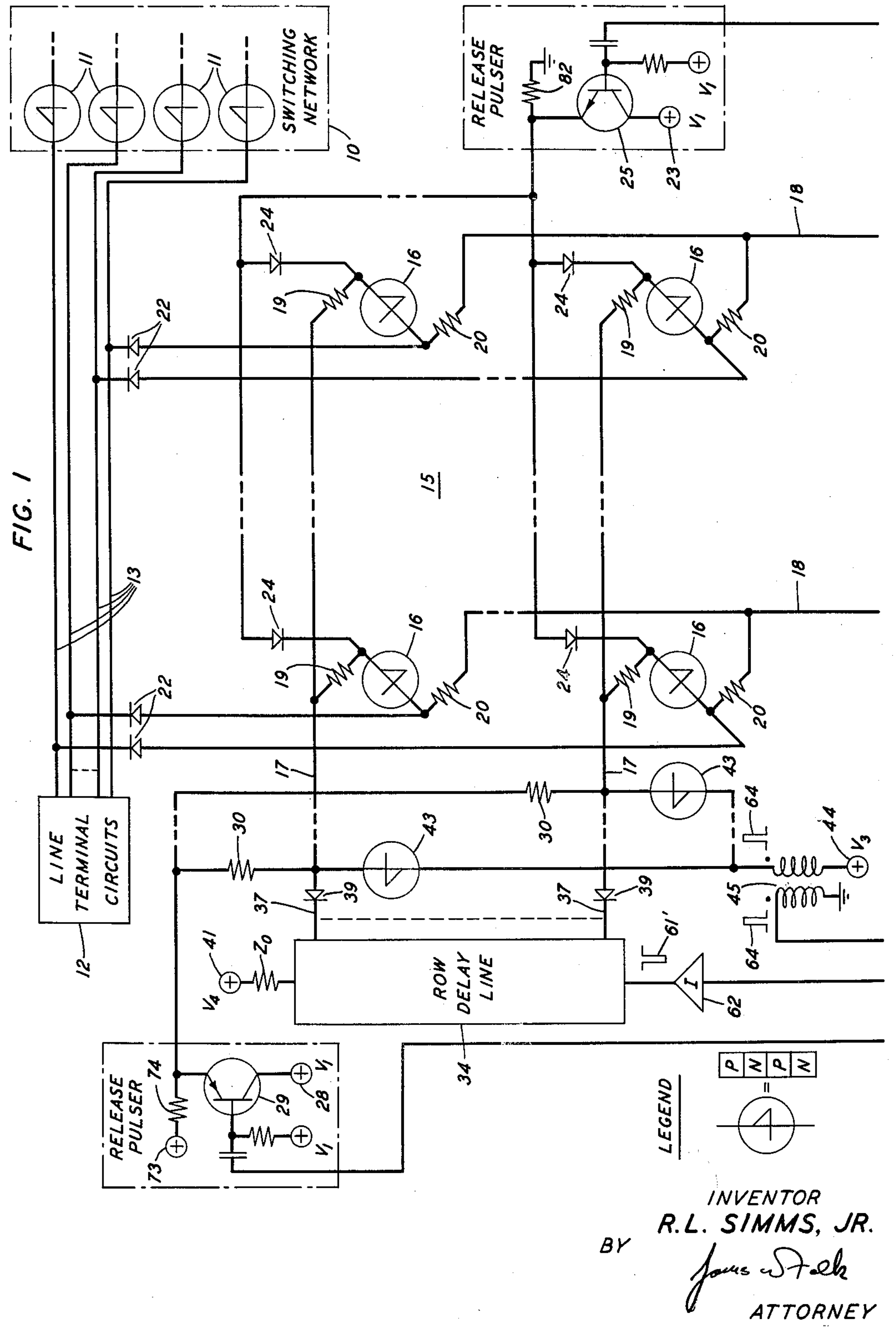
Figure 2:
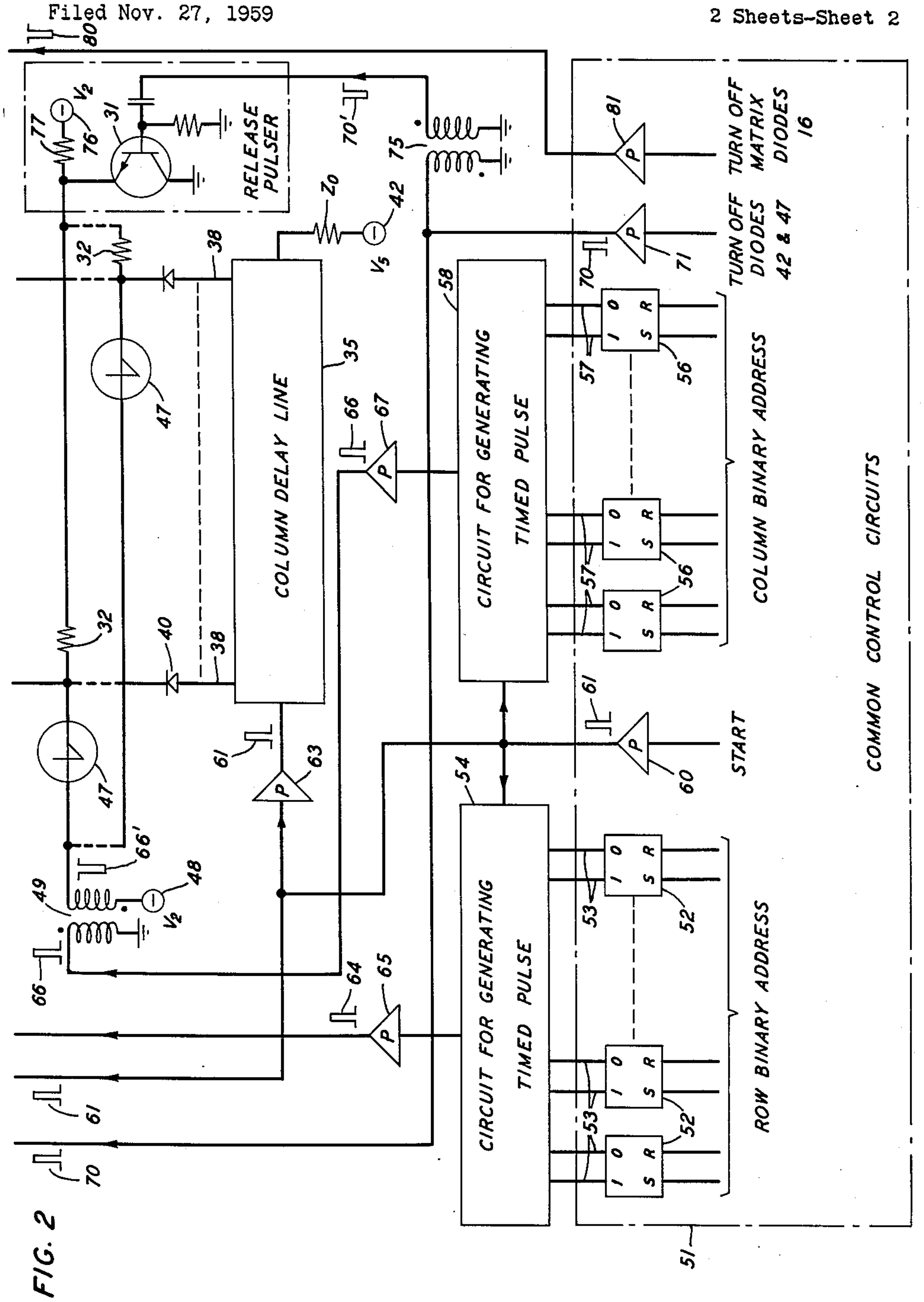

This invention relates to communication switching systems and more particularly to selecting circuits for marking terminals of a switching network for such systems.

In electronic switching systems the switching network may comprise breakdown devices as crosspoint elements arranged in a plurality of stages; such breakdown devices may be gaseous discharge devices or semiconductor devices. Advantageously the switching network may be end marked. By this it is meant that in response to the recognition of a request for a communication path through the switching network, a selector circuit is enabled to apply a marking potential to an end terminal of the crosspoint switching network, the series connected crosspoints in the network then breaking down successively in response to this marking signal which is propagated along one or more paths through the network. As is known, on breakdown of all the crosspoints in one distinct path through the network, the crosspoints in other possible paths are extinguished by a lock-out action. Similarly, internal marking may be utilized.

In order to mark the switching network in the manner just described a selector circuit is employed which, in response to control signals supplied to it from the common control circuitry of the switching system, acts to select the particular network terminal desired. Such a selector circuit should be reliable and should not respond to spurious signals. Further, when the selector circuit is in the process of selecting a particular network terminal, it should not respond to other input signals which might cause multiple end-marking signals to be applied to the switching network.

Such selector circuits have generally required the occurrence of time coincident pulses to cause the selection of the desired network terminal. The requirements of time coincidence of the enabling pulses and the necessity of preventing false operation or repetitive operation of the selector circuit have necessitated very accurate operating margins.

It is an object of the present invention to provide an improved selector circuit for communication switching networks.

It is another object of this invention to enable a selector circuit on the occurrence of a pair of input pulses which need not be in accurate time coincidence.

It is a further object of this invention to prevent erroneous operation of a selector circuit and accordingly to prevent false marking of a switching network.

It is a still further object of this invention to reduce the operating margins required for reliable and accurate operation of a selector circuit.

These and other objects of this invention are attained in one specific illustrative embodiment wherein a selector circuit comprises a coordinate array of breakdown devices, which may be semiconductor p-n-p-n diodes, sometimes referred to as two-terminal transistors. These diodes are advantageously p-n-p-n diffused silicon devices of the type disclosed in W. Shockley Patent 2,855,524, October 7, 1958, and also described in an article "P-N-P-N Transistor Switches," by Moll, Tanenbaum, Goldey, and Holonyak in the Proceedings of the I.R.E., volume 44, No. 9, page 1174 (September 1956), and an article by W. Shockley, "The Four-Layer Diode," in Electronic Industries and Teletech, August 1957, page 58.

Such breakdown diodes, as they shall herein be called, when connected in series with load resistors have a stable low current operating characteristic until the breakdown voltage is exceeded, following which they can be maintained in their stable higher current conduction state by a lower voltage.

In accordance with this specific embodiment of my invention these breakdown diodes are connected in a coordinate array with row and column leads connected to opposite ends of the series diode-resistor combinations. Each row lead is connected to a tapped terminal of a distributed delay line; such delay lines employing resistors and capacitors are well known in the art and need not be further described here. Similarly, each column lead is connected to a tapped terminal of a second distributed delay line.

In accordance with an aspect of my invention, each row conductor also has connected thereto one terminal of a second breakdown diode of the type described above; the other terminal of each of these second breakdown devices is multipled to a common circuit for generating a timed pulse, the time occurrence of the pulse from this common circuit depending on the binary address applied thereto from the common control circuitry. In the operation of my invention a start pulse applies an energizing signal to the delay line and simultaneously to the circuit for generating the timed pulse. As the energizing pulse travels along the delay line, each tap, and thus each row conductor is successively energized. The voltage applied to the row conductor from this delay tap is chosen, however, to be a value insufficient of itself to cause breakdown of the associated delay line breakdown diode. At some instant during the passage of this energizing pulse down the delay line, the timed pulse generator circuit will apply a pulse, in common, to all of the delay line breakdown diodes. However, only that diode which at that instant has a voltage applied to it from a delay line tap will break down. Breakdown of this delay line diode then applies an enabling voltage along the row conductor to the breakdown diodes connected to that row in the coordinate selector array or matrix. This enabling voltage alone, however, is also insufficient to break down the breakdown diodes in the selector array.

Similarly, the start or energizing pulse is applied to the column delay line and, together with a timed pulse from a time pulse generating circuit, causes a single diode connected to one column conductor of the selector array to break down, thereby applying a second enabling voltage to the selector array. Only that breakdown diode connected between the enabled row and column conductors of the array will break down and conduct.

The breakdown diodes of the selector array or matrix are also each connected in series between a marking potential source and the individual input terminals or conductors of the switching network. Breakdown of a particular diode in the array therefore applies a marking pulse or potential to the particular input conductor of the switching network connected to that specific breakdown diode in the selector array.

It should be noted that a breakdown diode in the selector array is not chosen by the time coincidence of the row and column enabling pulses. Instead in most instances the row and column conductors will be enabled at different times, the breakdown diodes connected to the taps on the row and column delay lines serving not only as gates but also as memory elements. Of course, the breakdown diodes in the selector matrix also possess memory so that the selected terminal of the switching network will remain marked for as long as may be desired to establish a path through the network without requiring the continued application of the row and column enabling pulses. Thus, in a large selector arrangement where a single selector may serve a switching network having its first stage crosspoints arranged in groups that may be simultaneously employed on different connections through the network, the row and column enabling circuitry may be released for use in locating another terminal to be marked while the memory inherent in the selector circuit maintains the marking potential at the priorly marked terminal.

Another important aspect of my invention relates to a lock-out feature whereby once a row or column lead to the selector array is enabled, no other enabling voltages can be applied to a different row or column lead, even though another pulse is applied to the row or column delay line and the timed pulse generating circuits connected with each delay line are operated. This lock-out operation is attained in arrangements in accordance with my invention because of the fact that when a p-n-p-n or breakdown diode connected to a row or column enabling conductor, and thus to a tap on either the row or column delay line, switches to its high conduction state, it effects a change in the input impedance of the delay line so that sufficient energy cannot be supplied at any other tap on the delay line to effect breakdown of a different p-n-p-n diode connected to another tap on the delay line. Accordingly, if another or spurious signal propagates along the delay line while a first breakdown diode connected to a tap on the delay line is in its high conduction state, as maintained by a distinct potential source provided in the circuit therewith, the conducting breakdown diode serves to extract energy from the delay line to reduce the pulse level in the delay line below the threshold at which the other breakdown devices connected to the taps thereof will be driven into their high conduction state. Thus, breakdown of one enabling diode precludes or locks out any spurious enabling pulses from appearing at other conductors.

It is a feature of my invention that a selector circuit include an array of p-n-p-n or breakdown diodes to which enabling potentials are applied on a non-time coincident basis.

It is another feature of my invention that enabling potentials be developed by the application of a start or energizing pulse to a tapped delay line, to the taps of which are connected individual breakdown diodes, a complementary enabling potential being applied to the other terminals of these breakdown diodes.

It is a further feature of my invention that a timed pulse generator circuit be connected to provide a timed pulse in common to the other terminals of these breakdown diodes connected to the individual taps of the delay line.

It is still another feature of my invention that release pulsers be connected for releasing the column and row enabling breakdown diodes independent of release of the breakdown diodes in the selector array.

It is still a further feature of my invention that the enabling delay line be terminated in its characteristic impedance to prevent reflections of energizing pulses therealong, the breakdown of an enabling diode connected to a tap on the delay line changing the termination of the delay line to effect lock-out of any other breakdown diode connected to another tap on the delay line.

A complete understanding of this invention and of these and various other features may be gained from consideration of the following detailed description and the accompanying drawing, the two figures of which, when placed together in an obvious way, depict one specific illustrative embodiment of my invention for end marking a crosspoint telephone switching network.

Turning now to the drawing there is depicted one specific illustrative embodiment of my invention wherein a selection matrix is employed to provide distinct marking potentials for an end-marked switching network 10, the selection matrix being enabled by row and column selectors in accordance with aspects of my invention. The switching network 10 may be of the types disclosed in applications Serial No. 731,923, filed April 30, 1958, of L. W. Hussey, and Serial No. 740,263, filed June 6, 1958, of E. A. Woodin, which networks include p-n-p-n diodes 11, only the first stage of the network being shown. Each first stage switching diode 11 is connected by an input conductor 13 to line terminal circuits 12. The terminal circuits 12 include the hold current supplies for the diodes of the network, the connecting circuitry for connecting the input conductors 13 to the subscriber lines (not shown), scanning circuitry that may be required for applying supervisory signals to the common control circuit of the switching system, and other circuit elements known in the art and required in a telephone switching system.

In accordance with my invention the end marking potentials are applied to the network input conductors 13 by a selector circuit including a matrix 15 of p-n-p-n or breakdown diodes 16 connected to row and column leads 17 and 18 by row and column resistors 19 and 20, respectively. At the same time each diode 16 is series connected between an input conductor 13 to be marked, to which it is connected by diode 22, and a reference potential 23, to which it is connected by diode 24 and a normally saturated n-p-n transistor 25.

The row conductors 17 are normally maintained at the potential $+V_1$ of source 28 by normally saturated p-n-p transistor 29, to which each conductor is connected through an individual resistor 30, and the column conductors are normally maintained at ground potential by saturated n-p-n transistor 31, to which they are connected through individual resistors 32.

In accordance with an aspect of my invention selection of a particular diode 16 to apply a positive marking pulse to an input conductor 13 is attained by means of a row delay line 34 and a column delay line 35. These delay lines, which may be of the lumped constant type, have taps 37 and 38, to which are connected respectively through diodes 39 and 40 the row and column leads 17 and 18 of the matrix 15. Each delay line is terminated in its characteristic impedance as by a resistor $Z_0$. Delay line 34 is connected through its resistor $Z_0$ to a source 41 of positive potential $+V_4$, while delay line 35 is connected through its resistor $Z_0$ to a source 42 of negative potential $-V_5$.

Also connected to each row conductor 17 is a p-n-p-n breakdown diode 43, the other terminal of which is connected to a common source 44 of positive potential $V_3$ through the secondary winding of a transformer 45. Similarly, each column conductor 18 has connected thereto a p-n-p-n breakdown diode 47, the other terminal of which is connected by the secondary winding of pulse inverting transformer 49 to the source 48 of potential $-V_2$.

A further appreciation of various aspects of my invention may be obtained from consideration of the operation of this specific embodiment in applying marking potential to a particular input conductor 13 of the switching network 10. When the common control circuits 51 determine that a specific input conductor 13 is to be marked, the row binary address of the breakdown diode 16 connected to that input conductor is applied, as from flip-flop circuits 52, over conductors 53 to a circuit 54 for generating a timed pulse. Similarly, the column binary address of particular breakdown diode 16 is applied, as from flip-flop circuits 56, over conductors 57 to a circuit 58 for generating a specific timed pulse. Circuits 54 and 58 may be of any type known in the art for obtaining an output on a single output conductor at a particular time dependent on a binary input. Thus, the circuit may comprise a series of pairs of transmission gates connected between an input terminal and the single output conductor. The first transmission gate of each pair has connected in series therewith a delay line having a binary weighted time delay, and the second transmission gate of each pair is connected in parallel with the series connected first transmission gate and binary weighted delay line. Enabling signals are applied to one of each pair of transmission gates from its associated flip-flop circuit 52 or 56, thereby determining that the input pulse either passes through the first of the pair of transmission gates and is delayed by the binary weighted delay connected thereto or is transmitted directly through the second transmission gate of the pair without any delay. In this manner a timed pulse will appear at the single output conductor delayed by the number of delay elements that the input pulse has had to pass through dependent on the binary value of the signals applied to each pair of transmission gates.

When it is desired to select the particular breakdown diode 16 to apply the end marking potential, a start pulse 61 is applied, as from a start pulse amplifier 60 in the common control circuits, to the input terminals of the circuits 54 and 58 for generating the timed pulses and also through an inverting amplifier 62 to the input of the row delay line 34 and through a pulse amplifier 63 to the column delay line 35. As the pulse 61′ is propagated along the delay line 34, successive enabling signals are applied through the diodes 39 to the individual selector diodes 43. None of these diodes 43, however, can break down until an output pulse 64 is applied through a pulse amplifier 65 from the output terminal of the time pulse generating circuit 54. Pulse 64 is applied to each of the breakdown diodes 43 through the pulse transformer 45; only that diode 43 which at that instant has the pulse 61′ applied to it from the delay line 34, however, will break down.

Normally, as mentioned above, row conductor 17 has the potential $+V_1$ of source 28 applied to it through transistor 29. On breakdown of a specific selector diode 43, however, the potential $+V_3$ of source 44 is applied through this diode 43 to that specific row conductor 17.

Similarly, at some instant, which will usually not be coincident with the generation of pulse 64 from time pulse generating circuits 54, the time pulse generating circuit 58 will generate an output pulse 66 which is applied through a pulse amplifier 67 to the pulse inverting transformer 49. The inverted pulse 66′ is then applied to one terminal of each of the p-n-p-n selector diodes 47, and that diode which at that instant has the pulse 61 applied to its other terminal from delay line 35 will break down. Column conductors 18 are normally at ground potential as applied through transistor 31; however, that specific conductor 18 having a diode 47 connected thereto which has broken down will now go to the potential $-V_2$ to the source 48. The application of the potential $+V_3$ from source 44 and $-V_2$ from source 48 across a unique breakdown diode 16 causes that diode to break down and to apply a positive signal to the selected input conductor 13 of the switching network 10. Input conductor 13 is normally at a hold potential applied to it from the line terminal circuits 12. On breakdown of the diode 16, however, the potential at the selected input conductor 13 is increased by a pulse of amplitude $+V_1$ applied from the source 23 through transistor 25, diode 24, the conducting breakdown diode 16, and the diode 22.

In the above-described embodiment advantageously voltage $V_4$ as from source 41 is larger than voltage $V_3$ as from source 44, which, in turn, is larger than voltage $V_1$ as from sources 23 and 28. Similarly, voltage $V_5$ from source 42 is more negative than voltage $V_2$ from source 48, which, in turn, is more negative than ground potential.

Diodes 39 and 40 serve to keep voltages in the matrix 15 from the delay lines 34 and 35. The delay lines also serve to provide an automatic lock-out, so that when a single diode 43 connected to row delay line 34 and a single diode 47 connected to column delay line 35 are broken down, additional pulses appearing at the output taps 37 and 38 of the delay line will be ineffective in breaking down additional diodes to cause mismarking through the matrix 15. This lock-out occurs because when one p-n-p-n breakdown diode is turned on, the termination of its associated delay line changes, even with the presence of the decoupling diode 39 or 40. This change in line termination can be considered as providing an undertermination of the delay line which results in reversed polarity pulse reflections with signal cancellation in the delay line. Its operation may also be considered as causing reflections which distribute the energy in the delay line such that an insufficient signal is applied at any other tap 37 or 38 to cause breakdown of the associated p-n-p-n diode.

After the matrix p-n-p-n diode 16 has broken down and the marking potential has been applied to input conductor 13 the selection circuitry comprising the delay lines 34, 35 and their associated breakdown diodes 43 and 47 may be released for utilization in the selection of a marking potential for another input conductor 13. This may advantageously be accomplished by the generation of a release pulse 70 as from pulse amplifier 71 in the common control circuits 51. This pulse 70 is applied to the transistor 29, which in effect is a release pulser circuit. The pulse 70 momentarily turns off transistor 29, thereby raising the potential aplied to all the row conductors 17 through the resistors 30 from $+V_1$ to $+V_3$ as applied from source 73 through a resistor 74. As each of the diodes 43 will then momentarily have potentials $+V_3$ applied to both their terminals, the one breakdown diode 43 which has been conducting will return to its high impedance state. Similarly, the pulse 70 is applied to a pulse inverting transformer 75 and the inverted pulse 70′ is applied to the release pulser circuit to turn off transistor 31, thereby lowering the potential applied through a resistor 32 to the one terminal of the conducting breakdown diode 47 from ground to $-V_2$ as applied from source 76 through a resistor 77.

Subsequently, after the switching network has established the desired communication path through itself in response to the end marking signals the conducting diode 16 may be returned to its non-conduction state, as the hold current for the path through the switching network will normally be supplied through the line terminal circuits 12. Turn-off of the conducting diode 16 may be attained by a negative pulse 80 supplied from a pulse amplifier 81 in the common control circuits 51 to the base of transistor 25 to momentarily interrupt conduction of that transistor, thereby lowering the potential applied to one terminal of each of the breakdown diodes 16 through the diodes 24 from $+V_1$ to ground as applied through the resistor 82.

As each of the resistors 19, 20, 30, 32, 74, and 82 is a decoupling resistor, its resistance may advantageously be quite large to limit the flow of current and the power consumption of the selector circuit. The particular values of resistance chosen for these resistors would, of course, depend on the other circuit parameters. However, advantageously resistors 19 and 20 are of the same value of resistance so that selection of a diode 16 is a symmetrical operation.

It is to be understood that the above-described arrangements are illustrative of the application of the principles of my invention. Numerous other arrangements may be devised by those skilled in the art without departing from the spirit and scope of the invention.

What is claimed is:

1. A telephone selector circuit comprising a plurality of line selecting terminals for establishing individual connections between subscriber lines and switching network paths, a first plurality of devices having a high and a low conduction state arranged in a coordinate array, a plurality of column and a plurality of row conductors connected to said devices in said array, a first delay line having tapped terminals therealong connected to said column conductors, a second delay line having tapped terminals therealong connected to said row conductors, means connecting each of said devices to an individual one of said terminals, a second plurality of said devices, one of said second plurality of devices being connected to each of said row and column conductors, means applying signal pulses to said first and said second delay lines for transmission therealong, means for applying timed pulses to said second plurality of devices for effecting a transfer from said low to said high conduction state of both a particular device in said second plurality connected to a row conductor and a particular device in said second plurality connected to a column conductor to jointly effect a transfer of a particular device in said array from a low to a high conduction state, and means for releasing said devices.

2. A telephone selector circuit in accordance with claim 1 wherein said releasing means comprises means for releasing said second plurality of devices independently of said first plurality of devices.

3. In combination, a delay line having a plurality of taps therealong, an enabling conductor connected to each of said taps, a plurality of devices having a high and a low conduction state each having one terminal connected to a distinct one of said enabling conductors, means for applying an energizing pulse to said delay line for propagation therealong, and means for applying signals to other terminals of said devices for effecting the transfer from said low to said high conduction state of one of said devices having a signal applied to the other terminal thereof on appearance of said energizing pulse at said tap connected to said one device.

4. The combination as set forth in claim 3 further comprising means for applying sustaining current to said devices and means for interrupting said sustaining current to release said devices.

5. The combination as set forth in claim 3 further comprising means for terminating said delay line in its characteristic impedance, transfer of conduction state of one of said devices effecting a mistermination of said delay line and preventing sufficient energy being applied to any other of said taps to effect transfer of conduction state of an additional one of said devices.

6. In combination, a delay line having a plurality of taps therealong, an enabling conductor connected to each of said taps, a plurality of devices having a high and a low conduction state each having one terminal connected to a distinct one of said enabling conductors, means for applying an energizing pulse to said delay line for propagation therealong, and means for applying a pulse in common to the other terminals of said devices in time coincidence with the appearance of said energizing pulse at a particular one of said taps for effecting a transfer from said low to said high conduction state of said device connected to said particular one of said taps.

7. In combination, apparatus for applying an enabling signal on one of a plurality of conductors comprising a delay line having a plurality of taps extending therealong, each of said conductors being connected to one of said taps, a device having a high and a low conduction state connected to each of said conductors, means for applying sustaining current to said devices, means for applying an energizing pulse to said delay line sequentially to apply an enabling pulse to each of said devices, and means for applying a pulse to said devices coincident with the appearance of an enabling pulse at a particular one of said taps to cause said device connected to said particular one tap to transfer to its high conduction state.

8. In a telephone system, a selector circuit for applying a marking potential to predetermined conductors comprising a coordinate array of devices having a high and a low conduction state, means connecting one terminal of each of said devices to an individual one of said conductors and for connecting the other terminal of each of said devices to a common source of marking potential, and means for causing a selected one of said devices to enter its high conduction state to apply said marking potential to the conductor connected thereto, said last-mentioned means including row and column conductors connected to said devices in said coordinate array, a row and a column delay line each having taps thereon to which said row and column conductors are connected, and means for applying an energizing pulse to each of said delay lines.

9. In a telephone system, a selector circuit in accordance with claim 8 further comprising a plurality of said devices each individually connected to one of said row and column conductors, and means for applying a timed pulse to said devices connected to said row conductors and for applying a timed pulse to said devices connected to said column conductors.

10. In a telephone system, a selector circuit in accordance with claim 9 further comprising pulse releaser means for causing any of said plurality of devices connected to said row and column conductors and in their high conduction state to be returned to their low conduction state.

11. A selector circuit for applying a marking potential to a predetermined one of a number of conductors comprising a coordinate array including a first plurality of devices having a high and a low conduction state having row and column conductors connected thereto, a common source of marking potential, a first plurality of diodes each connected in series with said common source and one terminal of each of said first devices, a second plurality of diodes each connecting the other terminal of each of said first devices to individual ones of said conductors to be marked, said first and second plurality of diodes being poled for passage of a marking pulse therethrough on transfer from said low to said high conduction state of one of said first devices, a row and a column delay line each having taps thereon, each of said row conductors being connected by one of a third plurality of diodes to one of said row delay line taps and each of said column conductors being connected by one of a fourth plurality of diodes to one of said column delay line taps, a second plurality of said devices each having one terminal connected to one of said row conductors, a third plurality of said devices each having one terminal connected to one of said column conductors, the other terminals of said second and third plurality of devices being respectively connected to first and second reference potential sources, means for applying an energizing pulse of one polarity to said row delay line and an energizing pulse of the opposite polarity to said column delay line, and means for applying timed pulses of said one polarity to said other terminals of said third plurality of devices and for applying timed pulses of said opposite polarity to said other terminals of said second plurality of devices.

12. A selector circuit in accordance with claim 11 further comprising means terminating each of said delay lines in its characteristic impedance, said third and fourth plurality of diodes being poled for passage therethrough of said opposite polarity energizing pulses to effect transfer from said low to said high conduction state of particular ones of said second and third plurality of devices depending on the occurrence of said timed pulses, the transfer of conduction state of one of said second and third plurality of devices effectively preventing an energizing pulse applied to another of said second and third plurality of devices connected to the same delay line being of sufficient energy to effect a transfer therein.

13. A selector circuit in accordance with claim 12 further comprising resistance means connecting each of said first plurality of devices in said array to said row and column conductors and resistance means connecting each of said row and column conductors to said first and second sources of reference potential.

14. A selector circuit in accordance with claim 13 further comprising release pulser means for interrupting the application of said first and second reference potential sources and said marking source thereby causing any of said devices in their high conduction state to return to their low conduction state.

No references cited.